United States Patent

Roberts

[11] Patent Number: 5,348,438
[45] Date of Patent: Sep. 20, 1994

[54] VEHICLE WHEEL CHANGING AID

[76] Inventor: Robert V. Roberts, R.R. 1, Box 79, Waskom, Tex. 75692

[21] Appl. No.: 88,826

[22] Filed: Jul. 7, 1993

[51] Int. Cl.⁵ .................................. B60B 29/00
[52] U.S. Cl. ........................... 414/426; 29/273; 254/8 R
[58] Field of Search ................ 414/426–428; 254/8 R, 131; 29/273

[56] References Cited

U.S. PATENT DOCUMENTS

| | | | |
|---|---|---|---|
| 2,345,458 | 3/1944 | Caron | 414/428 |
| 2,517,631 | 8/1950 | Coleman | 414/428 |
| 2,551,483 | 5/1951 | Bartoe | 414/428 |
| 2,569,242 | 9/1951 | Kors | 254/131 |
| 2,579,853 | 12/1951 | Pardee | 414/428 X |
| 2,639,131 | 5/1953 | Hudspeth | 254/131 |
| 2,808,162 | 10/1957 | Hellyer | 254/131 X |
| 3,463,337 | 8/1969 | Reznicek | 414/428 |
| 3,649,976 | 3/1972 | Isom | 254/131 X |
| 4,256,430 | 3/1981 | Pugel | 414/428 |
| 4,602,415 | 7/1986 | Garcia | 29/273 |
| 4,690,605 | 9/1987 | Coccaro | 414/426 R |
| 4,872,694 | 10/1989 | Griesinger | 414/428 X |
| 4,930,966 | 6/1990 | Chien | 414/427 |
| 5,007,789 | 4/1991 | Painter | 414/426 X |
| 5,123,470 | 6/1992 | Tran | 254/131 X |
| 5,176,487 | 1/1993 | Flitton | 414/428 |
| 5,180,141 | 1/1993 | Hunt | 254/131 |

FOREIGN PATENT DOCUMENTS 1053333  3/1959  Fed. Rep. of Germany .

Primary Examiner—David A. Bucci
Attorney, Agent, or Firm—Woodard, Emhardt, Naughton, Moriarty & McNett

[57] ABSTRACT

A vehicle wheel changing aid for mounting and removing a vehicle wheel to and from a jacked position on the wheel axle of a vehicle. The device includes a rocker base having an operator end, a wheel receiving end, and a bottom facing pivot surface adapted to contact the ground as the rocker base is pivoted. A plurality of spaced apart rollers are mounted on the base near the wheel receiving end and allow rotation of a vehicle wheel in order to accurately align the wheel lug openings with the lugs on the axle hub during the changing procedure. A knee/foot bearing pad is positioned towards the operator end of the base and permits the vehicle wheel to be raised or lowered from the axle hub of the vehicle by applying the operator's knee/foot to rock the base of the device. The knee/foot bearing pad may be extendably mounted to the base to increase the mechanical advantage in raising and lowering the wheel and provide additional operator clearance for safety purposes. A pair of wheels is mounted to the base on an axis transverse to the rollers to permit dollying the vehicle wheel to and away from the axle hub.

11 Claims, 5 Drawing Sheets

VEHICLE WHEEL CHANGING AID

BACKGROUND OF THE INVENTION

1. Field of the Invention

The subject invention relates generally to the field of tools for assisting in the changing of wheel assemblies on the axle hubs of vehicles and, more particularly, to a tool of a type which provides a mechanical advantage in supporting the weight of the wheel and which helps to align the wheel lug openings with the lugs on the axle hub of a vehicle.

2. Description of the Prior Art

A typical problem encountered in changing flat tires involves the physical strength needed to raise, lower, align and otherwise manipulate the tire during the changing operation. Even for persons of average strength, such operations can require considerable exertion and bending with the risk of unduly straining the back or other body muscles. Moreover, it is possible to damage the threads on the lugs so as to make mounting the tire even more difficult or even impossible to accomplish.

The prior art discloses a variety of tools designed to assist the motorist in manipulating the tire during the changing procedure, the following references being exemplary:

| | |
|---|---|
| U.S. Pat. No. 5,180,141 | Hunt |
| U.S. Pat. No. 5,176,487 | Flitton |
| U.S. Pat. No. 2,808,162 | Hellyer |
| U.S. Pat. No. 2,569,242 | Kors |
| U.S. Pat. No. 2,551,483 | Bartoe |
| U.S. Pat. No. 2,639,121 | Hudspeth |
| U.S. Pat. No. 4,602,415 | Garcia |
| U.S. Pat. No. 3,649,976 | Isom |
| U.S. Pat. No. 4,690,605 | Coccaro |
| U.S. Pat. No. 4,930,966 | Chien |
| German 1053333 | Poppe |

While the devices disclosed in the above-listed patents attempt to solve various aspects of the concerns previously noted and others, they suffer disadvantages as well. The Hunt device, for example, does not provide a way to align the lug openings on the wheel assembly with the lugs on the axle hub and requires the operator to use a hand-operated bar to raise and lower the tire. Practically speaking, the Hunt device can be difficult to use because one or both hands need to be used to manipulate the bar, making it difficult to also manipulate the tire. The Kors device is also apparently designed to apply leverage with one hand while the tire is manipulated with the other hand. The device of Hellyer apparently frees the use of both hands by permitting leverage to be applied to the tire with the knee, however, no means is disclosed for assisting alignment of the lug openings and the lugs or for assisting in moving the tire once lifted from the lugs. Bartoe discloses a device which requires the operator to sit, somewhat precariously, on a lever arm in order to raise and lower the tire into position.

SUMMARY OF THE INVENTION

A vehicle wheel changing aid for mounting and removing a vehicle wheel to and from a mounted position on the wheel axle of a vehicle according to one embodiment of the present invention comprises a rocker base including an operator end, a wheel receiving end located remote from the operator end, and a bottom facing pivot surface adapted to contact the ground as the rocker base is pivoted. The changing aid may be further characterized as having a plurality of spaced apart rollers mounted on the rocker base proximate to the wheel receiving end and adapted to rotatably support a vehicle wheel positioned thereon. In addition, there is provided a knee/foot bearing surface positioned towards the operator end of the base and opposing the bottom facing pivot surface and a pair of wheels rotatably mounted to the base on an axis transverse to the rollers and positioned proximate to the wheel receiving end of the rocker base.

In a further embodiment of the present invention there is provided a vehicle wheel changing aid for mounting and removing a vehicle wheel to and from a mounted position on the wheel axle of a vehicle. The changing aid comprises a base including an operator end and a wheel receiving end located remote from the operator end. Additionally, there is provided a plurality of spaced apart rollers mounted on the base proximate to the wheel receiving end and adapted to rotatably support a vehicle wheel positioned thereon. A knee/foot bearing surface is also provided which is positioned towards the operator end of the base, the base and the knee/foot bearing surface being suitably sized and arranged such that the knee/foot bearing surface extends no more than about a foot above the ground when the changing aid is operably positioned beneath a vehicle wheel mounted on the wheel axle of a vehicle. The vehicle wheel changing aid is further characterized by having a pair of wheels rotatably mounted to the base on an axis transverse to the rollers. The wheels are operably positioned relative to the knee/foot bearing surface and the rollers such that the axis of the wheels provides a fulcrum therebetween for raising and lowering a vehicle wheel supported by the rollers.

It is an object of the present invention to provide an improved device for facilitating the installation and removal of a tire from a jacked wheel hub.

Related objects and advantages of the present invention will become even more apparent from reference to the following figures and detailed description.

DESCRIPTION OF THE PREFERRED EMBODIMENT

Figure 1:
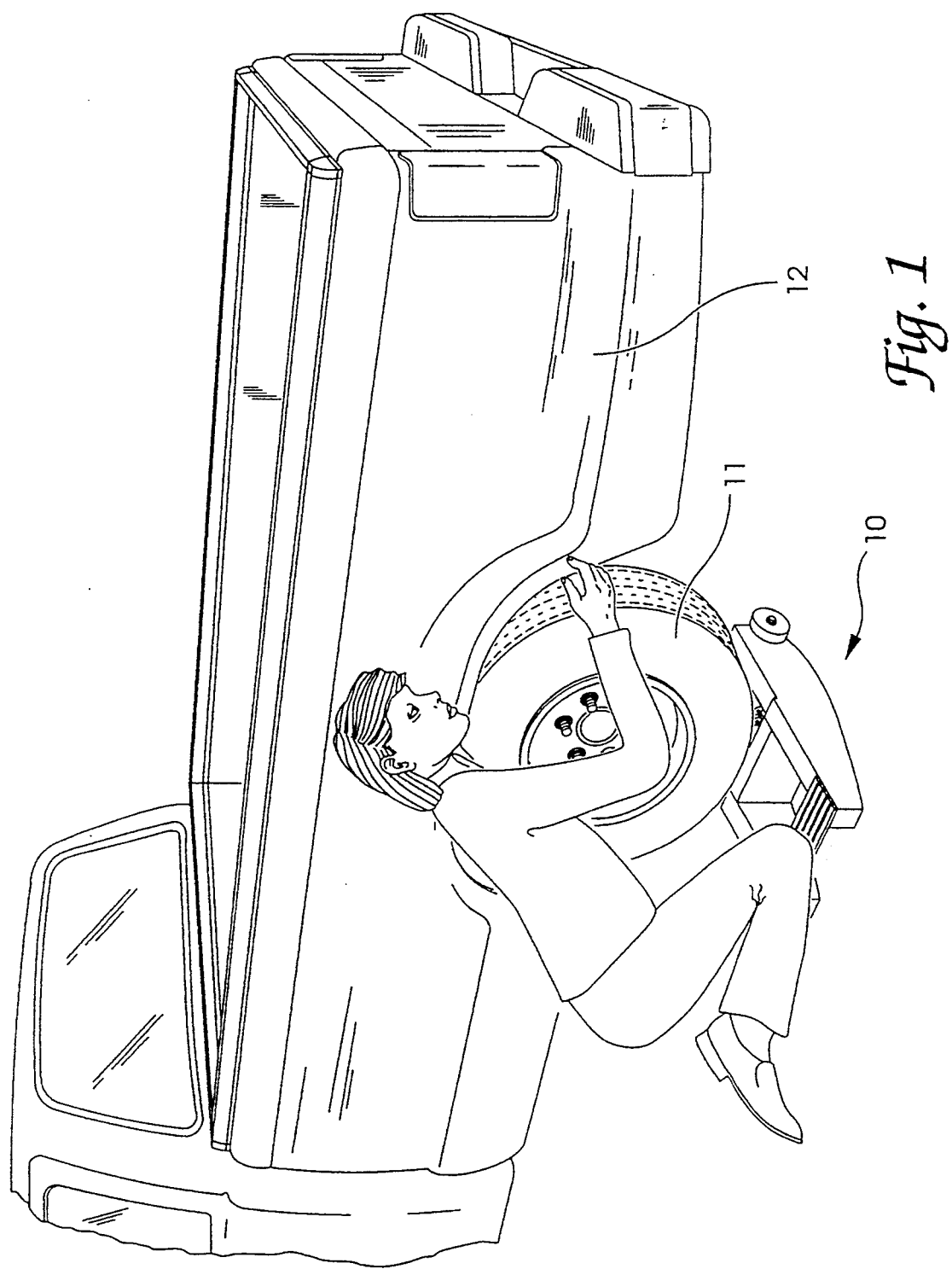
FIG. 1 is a pictorial representation illustrating the operation of the wheel changing aid of the present invention in changing a tire.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
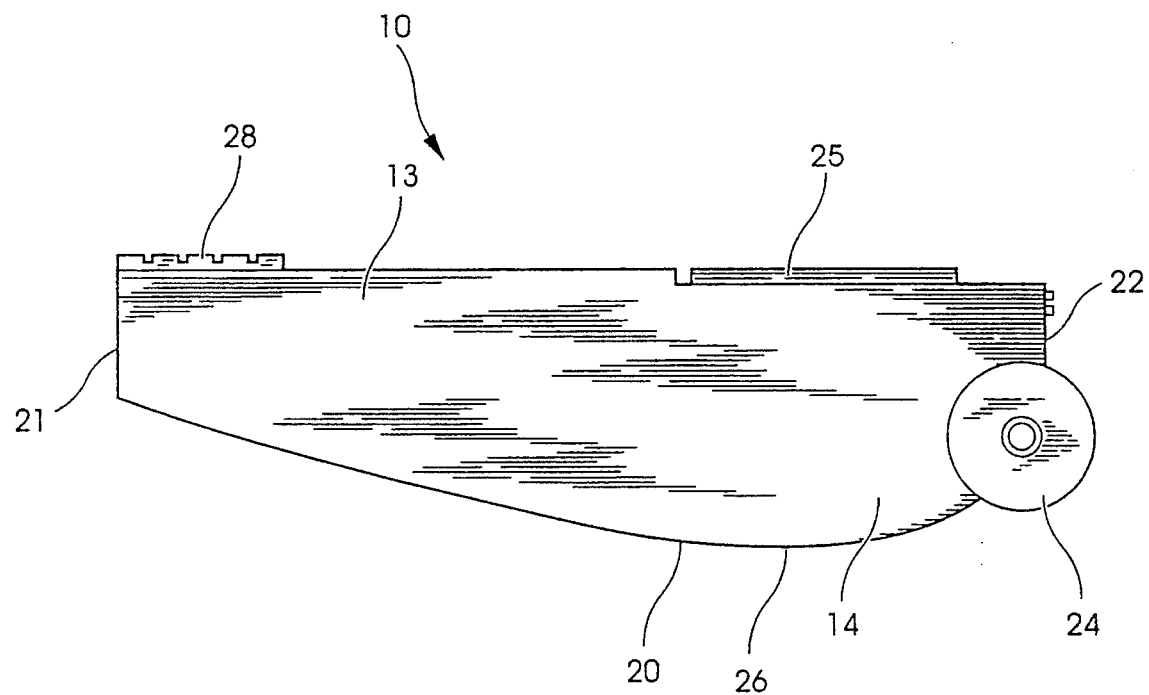
FIG. 2 is a side elevational view of the changing aid of FIG. 1.
Figure 3:
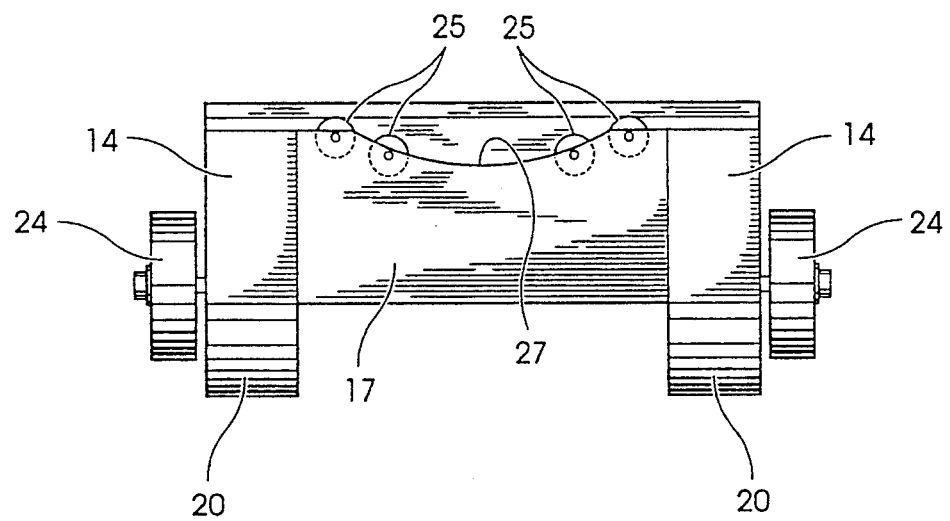
FIG. 3 is an end elevational view of the changing aid of FIG. 1 taken from the right side of FIG. 2 and showing the wheel receiving end.
Figure 4:
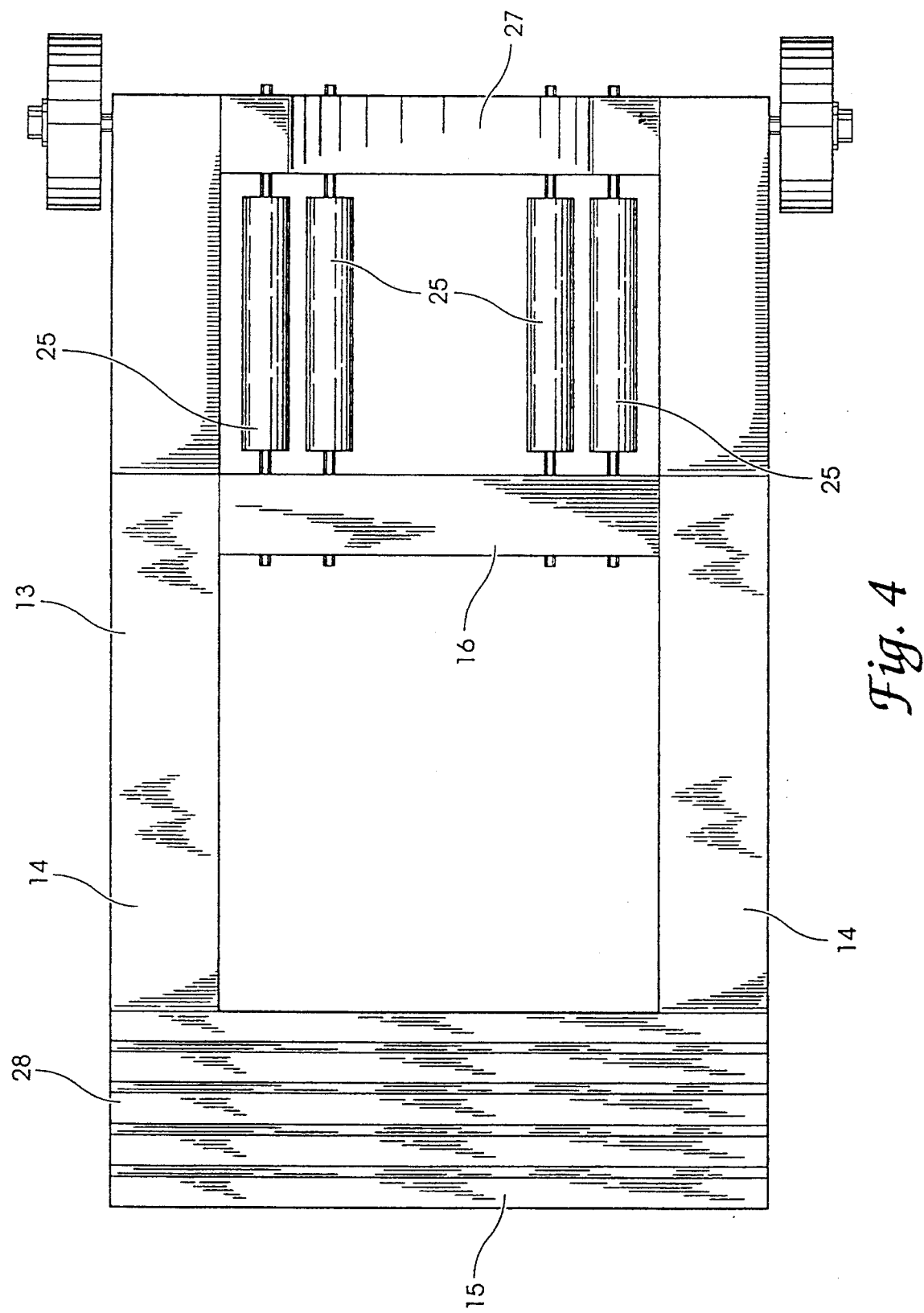
FIG. 4 is a top plan view of the changing aid of FIG. 1.

Referring now to the drawings in detail, FIG. 1 shows the vehicle wheel changing aid of the present invention generally designated at 10 in an operative position to change a tire 11 mounted on the left rear axle hub of vehicle 12. As seen more particularly in FIGS. 2–4, the changing aid 10 includes a base frame 13 which as seen in plan view in FIG. 4 is generally rectangularly shaped. The base frame 13 includes a pair of elongate parallel extending members 14 held together in spaced relation by cross members 15, 16 and 17. As opposed to the frame construction, members 14–17 could alternatively be integrally formed in a one-piece construction. As seen in FIG. 3, the lower facing surface of members 14 defines a pivot surface 20 extending from the operator end 21 to the wheel receiving end 22 of the device. Pivot surface 20 is continuously curved and has a generally ovoidal shape which somewhat resembles a parabola or part ellipse with the curvature being relatively small at the operator end 21 and progressively increasing towards the receiving end 22. Adjacent the receiving end 22 is mounted a pair of wheels 24. A series of four rollers 25 are rotatably mounted to cross members 16 and 17. The rollers 25 are axially aligned transverse to the axis of wheels 24. As seen in FIG. 2, rollers 25 are positioned directly above the lowermost portion 26 of pivot surface 20. As seen in FIG. 3, the pair of outer rollers 25 are positioned above the pair of inner rollers 25 so as to define a generally concave shaped upwardly facing bearing surface upon which to support a vehicle tire. The upper facing surface 27 of cross member 17 is concave shaped in order to provide clearance for the tire as it is being positioned on or from the rollers 25, thus allowing the tire to be jacked to a lower height. At the operator end 21 is a knee/foot pad 28 which serves both as a more comfortable bearing surface and is treated to prevent slippage during use. The knee/foot pad 28 may be rigidly fixed to the base frame 13 or, alternatively, may be extendably mounted such as for example in the manner shown in FIGS. 5 and 6. Knee/foot pad 28 is arranged to extend no more than about a foot above the ground, and preferably about seven inches, when in its up position, i.e., before any downward force is applied thereon to lift the vehicle tire. The relatively low height permits even relatively weak persons to apply considerable downward force on knee/foot pad 28.

Figure 5:
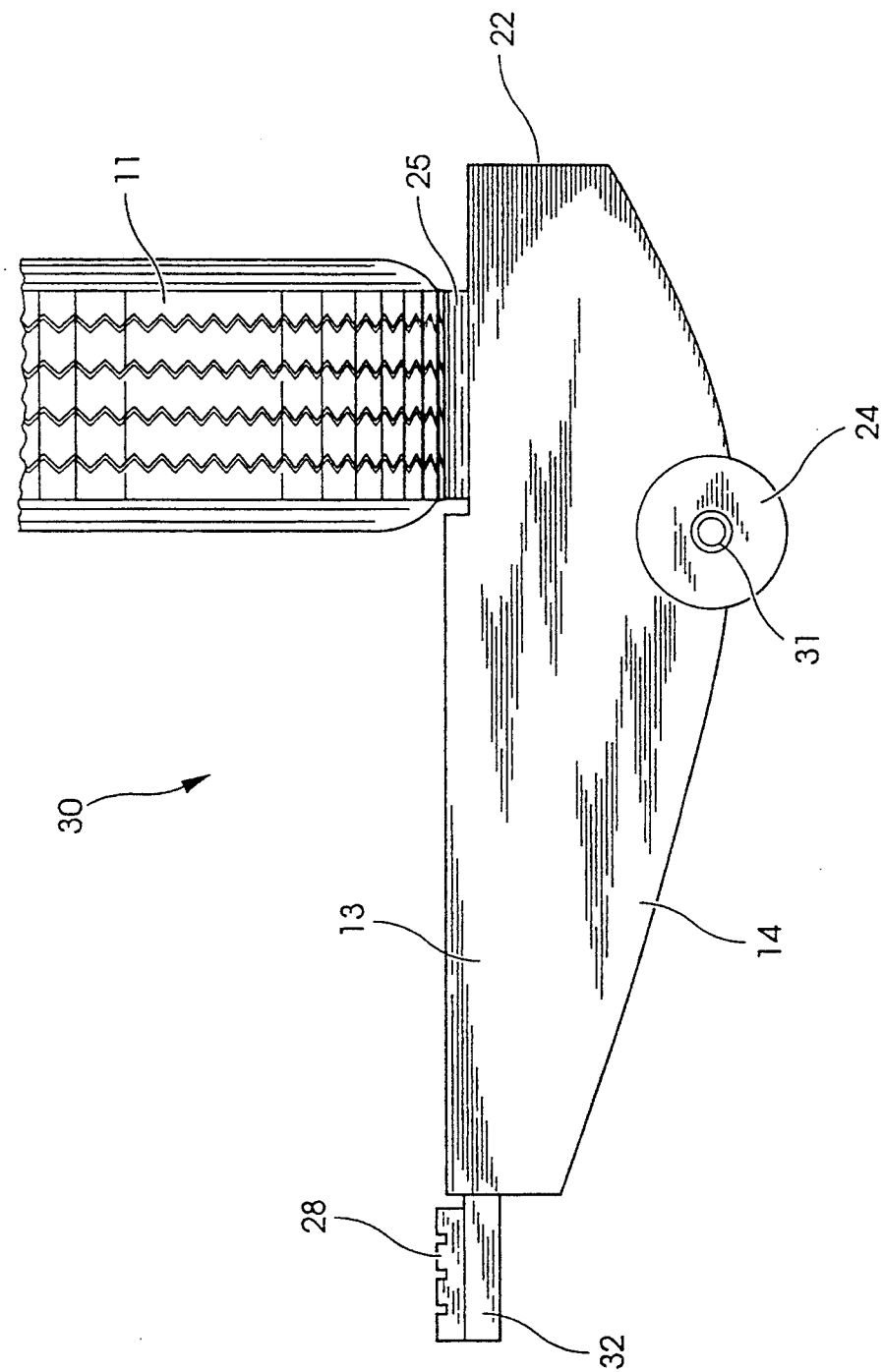
FIG. 5 is a side elevational view showing a modified version of the wheel changing aid of the present invention with a tire received thereon.
Figure 6:
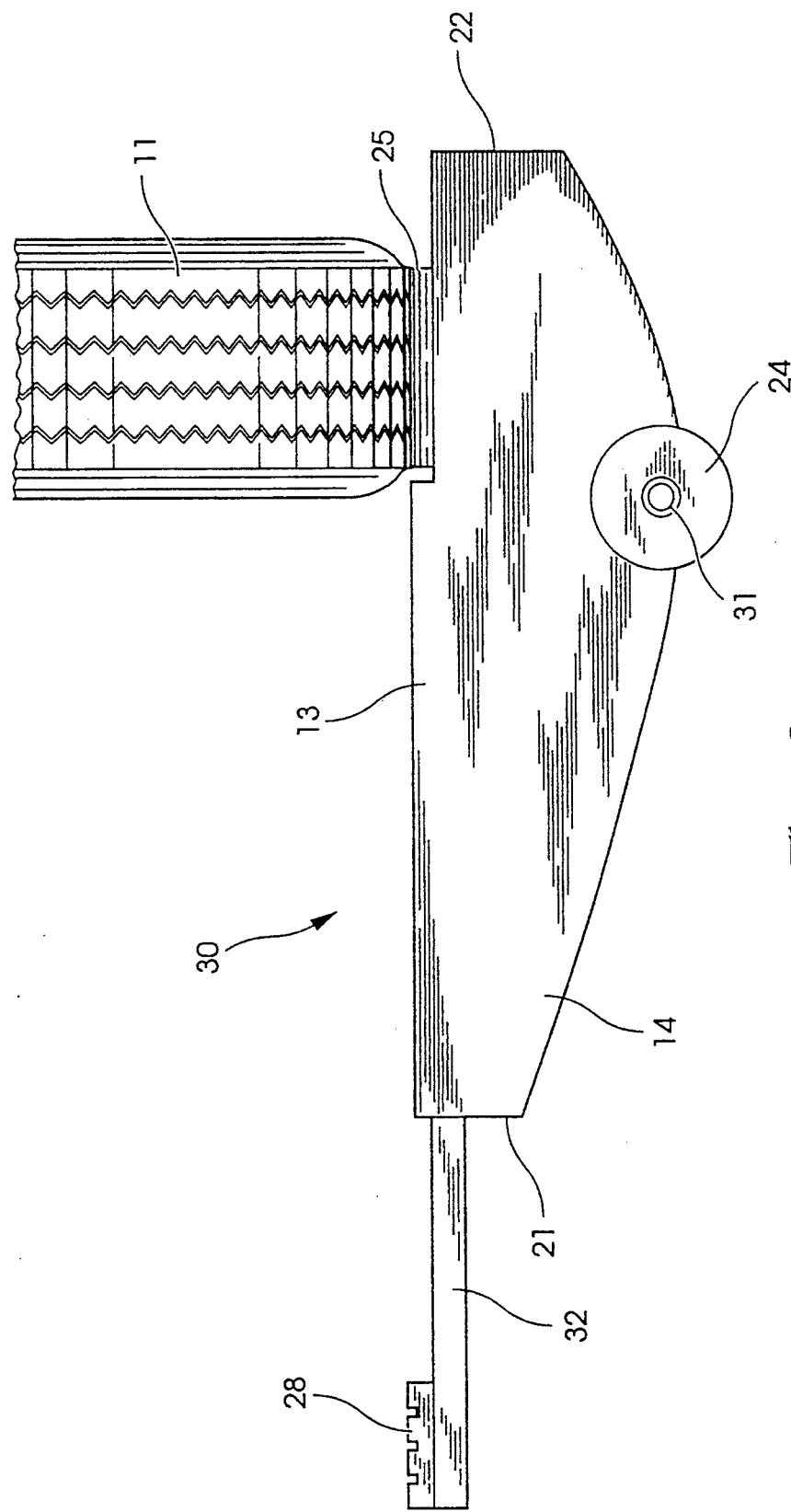
FIG. 6 is a further side elevational view of the changing aid of FIG. 5 but showing the knee/foot bearing surface in its extended position.

Referring more particularly to FIGS. 5 and 6, an alternative preferred embodiment of the vehicle wheel changing aid of the present invention is shown designated by the reference numeral 30. In this alternative embodiment, elements similar to those in the previous embodiment are referenced by the same numeral designation. Changing aid 30 is formed similar to the changing aid 10 of the previous embodiment except that wheels 24 are repositioned so as to extend below base frame 13 and the wheel axle 31 provides a fixed pivot point, located outwardly of the vehicle between the load axis of the tire 11 and the knee/foot pad 28, for pivoting the base frame 13 and thereby raising or lowering tire 11. In addition, the knee/foot pad 28 is extendably mounted to base frame 13 on a pair of spaced apart arms 32. The arms 32, only one of which is seen in FIGS. 5 and 6, are slidably journaled in a suitable manner to base frame 13.

In operation, the changing aid 10 of FIGS. 2–4 is positioned under a tire which has been elevated to suitable height using a jack or other such tool. The tire and changing aid should be positioned so that the changing aid 10 is approximately level as seen in FIG. 5 with the tire 11 contacting rollers 25. The operator then presses downwardly on pad 28 with his knee/foot, causing the base frame 13 to pivot the tire upwardly. As the tire is raised, the point of pivotal contact on the pivot surface 20 will move progressively towards the operator end changing the lever arm and reducing the mechanical advantage and rocking the tire towards the operator. The provision of a rocking base frame having an ovoidal curved pivot surface allows the lifting action on the tire to be controlled more precisely so as to allow the tire to be raised from the lugs on the axle hub and to provide a horizontal movement component allowing the tire to clear the lugs while at the same time not so severely tilting the tire so as to damage the lug threads as the tire is being removed therefrom. It is to be noted that because the curvature of the pivot surface 20 is greater in the region proximate to the rollers 25 and lessens as it approaches the operator end 21, the surface 20 imparts a greater vertical component initially to lift the tire from the lugs and thereafter imparts a greater horizontal component to assist in clearing the tire from the lugs and outwardly away of the vehicle. The rocking motion provided by surface 20 therefore offers an advantage over devices which merely allow pivoting of the tire about a fixed pivot point.

Once the tire is removed from the axle hub, the operator end 21 of the changing aid 10 can be tilted upwardly until wheels 24 contact the ground and the changing aid 10 with tire mounted thereon may then be wheeled away. The tire to be replaced may then be exchanged for a spare tire and the spare tire wheeled into position using the changing aid 10. Once in position adjacent the axle hub, the lug openings on the tire to be installed are aligned with the lugs on the axle hub by rotating the tire on the rollers 25 as necessary.

In the alternative embodiment of the device shown in FIGS. 5 and 6, the knee/foot pad 28 is extendable from the base frame 13 to allow additional leverage to be applied if needed, and also to provide greater clearance between the operator and the vehicle so that the physical danger caused by a collapse of the jack at any stage of the mounting procedure will be greatly reduced. In addition, the extendability feature allows the device to be made more compact for storage reasons, and then extended as necessary during use. The operation of the alternative embodiment of FIGS. 5 and 6 is similar to that previously described, except that the wheels 24 serve as the fulcrum for raising and lowering the tire in addition to facilitating the movement of the tire towards and away from the axle hub during the mounting procedure. While the extendable knee/foot pad is shown in connection with the embodiment of FIGS. 5 and 6, the embodiment of FIGS. 2–4 could also be modified to incorporate this feature.

In both embodiments, the series of rollers 25 are arranged as shown in FIGS. 2 and 4 defining a generally concave bearing surface which will accommodate tires of various sizes and provide a more stable bearing surface upon which to manipulate the tire during the changing procedure.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vehicle wheel changing aid for mounting and removing a vehicle wheel to and from a mounted position on a wheel axle of a vehicle, said vehicle wheel changing aid comprising:
    a rocker base including an operator end, a wheel receiving end located remote from said operator end, and a bottom facing pivot surface adapted to contact the ground as said rocker base is pivoted, said bottom facing pivot surface having a lowermost portion located directly below said rollers;
    a plurality of spaced apart rollers mounted on said base proximate to said wheel receiving end and adapted to rotatably support a vehicle wheel positioned thereon;
    a knee/foot bearing surface positioned towards the operator end of said rocker base, said knee/foot bearing surface opposing said bottom facing pivot surface; and
    a pair of wheels rotatably mounted to said base on an axis transverse to said rollers, said wheels positioned proximate to said wheel receiving end of said rocker base, said wheels further positioned so as not to extend below the lowermost portion of said bottom facing pivot surface.

2. The vehicle wheel changing aid of claim 1 wherein said bottom facing pivot surface is continuously curved.

3. The vehicle wheel changing aid of claim 2 wherein said bottom facing pivot surface has an ovoidal shape which increases in curvature from said operator end towards said receiving end.

4. The vehicle wheel changing aid of claim 3 wherein said plurality of rollers includes multiple pairs of rollers, successive ones of said pairs of rollers being spaced horizontally and vertically apart so as to define an upwardly facing convex roller bearing surface for rotating a vehicle wheel thereon.

5. The vehicle wheel changing aid of claim 4 wherein said knee/foot bearing surface is extendably connected to said rocker base.

6. The vehicle wheel changing aid of claim 5 and further comprising a plurality of connecting arms attached to said knee/foot bearing surface and extendably coupled to said rocker base.

7. A vehicle wheel changing aid for mounting and removing a vehicle wheel to and from a mounted position on a wheel axle of a vehicle, said vehicle wheel changing aid comprising:
    a base including an operator end and a wheel receiving end located remote from said operator end;
    a plurality of spaced apart rollers mounted on said base proximate to said wheel receiving end and adapted to rotatably support a vehicle wheel positioned thereon;
    a fulcrum on said base for pivoting said rollers; and
    a knee/foot bearing member extendably coupled to the operator end of said base for extension relative to said fulcrum, said base and said knee/foot bearing member suitably sized and arranged such that said knee/foot bearing member extends no more than about a foot above the ground when said changing aid is operably positioned beneath a vehicle wheel mounted on the wheel axle of a vehicle;
    said fulcrum including a pair of wheels rotatably mounted to said base on an axis transverse to said rollers and positioned between said knee/foot bearing member and a load axis of a tire operably positioned on said rollers, said wheels further positioned proximate to said wheel receiving end of said base.

8. The vehicle wheel changing aid of claim 7 wherein said fulcrum further includes a continuously curved bottom facing pivot surface on said base.

9. The vehicle wheel changing aid of claim 8 wherein said bottom facing pivot surface has an ovoidal shape which increases in curvature from said operator end towards said receiving end.

10. The vehicle wheel changing aid of claim 7 and further comprising a plurality of telescoping connecting arms attached to said knee/foot bearing member and extendably coupled to said base.

11. The vehicle wheel changing aid of claim 7 wherein said plurality of rollers includes multiple pairs of rollers, successive ones of said pairs of rollers being spaced horizontally and vertically apart so as to define an upwardly facing convex roller bearing surface for rotating a vehicle wheel thereon.

* * * * *